United States Patent [19]
Bachle

[11] 3,750,825
[45] Aug. 7, 1973

[54] SELF-CLOSING CAP
[75] Inventor: Carl F. Bachle, Grosse Pointe Farms, Mich.
[73] Assignee: Teledyne Industries, Inc., Los Angeles, Calif.
[22] Filed: Jan. 25, 1971
[21] Appl. No.: 109,500

[52] U.S. Cl................. 220/35, 220/86 R, 296/1 C
[51] Int. Cl..... B65b 3/00, B65d 43/16, B65d 51/00
[58] Field of Search........................... 220/35, 86 R; 280/5 A, 152 A; 296/1 C; 184/88 R; 105/377

[56] References Cited
UNITED STATES PATENTS

| | | | |
|---|---|---|---|
| 3,580,414 | 5/1971 | Ginsburgh et al................. | 220/86 R |
| 2,865,653 | 12/1958 | Nixon................................. | 296/1 C |
| 1,277,918 | 9/1918 | Harris.................................. | 220/35 |
| 2,606,772 | 8/1952 | Mead et al.......................... | 280/5 A |
| 2,143,626 | 1/1939 | Jones.................................. | 220/35 |
| 2,314,710 | 3/1943 | Keller................................. | 220/35 |
| 2,893,779 | 7/1959 | Bayley................................ | 296/1 C |
| 2,812,955 | 1/1957 | Urban et al........................ | 280/5 A |

Primary Examiner—George E. Lowrance
Assistant Examiner—Stephen Marlus
Attorney—Hauke, Gifford and Patalidis

[57] ABSTRACT

A cap for closing a filler tube or the like having a spring hinge mechanism designed to maintain the cap in an open position when the cap is on one side of an over-center position and to snap the cap closed when the cap is pivoted to the other side of the over-center position. Means are provided to reduce the likelihood that the cap will remain in the opened position when the machinery to which the filler tube is attached is put into operation. In one embodiment, this is achieved by mounting the tube and the cap so that vibrations of the tube upon operation of the machinery will shake the cap past the over-center position to cause it to snap shut. In another embodiment, a cover is provided which is movable away from the tube to permit access to the cap and to move against the cap when closed to move the cap past the over-center position and to snap the cap closed.

5 Claims, 11 Drawing Figures

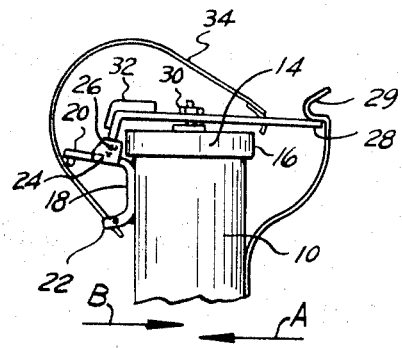
FIG. 1
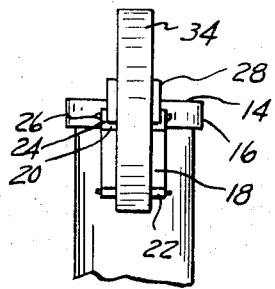
FIG. 2
FIG. 3
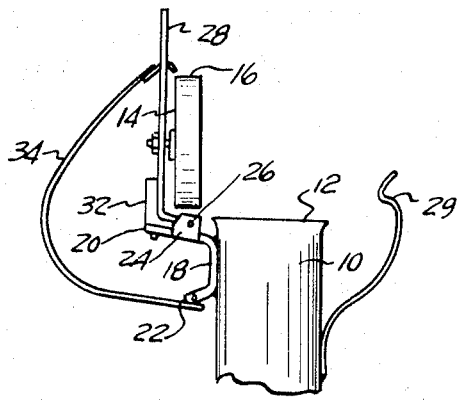
FIG. 4
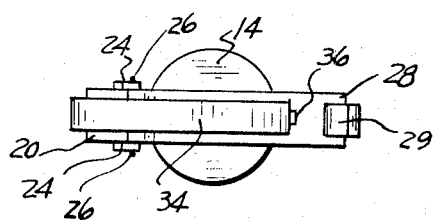
INVENTOR
CARL F. BACHLE
BY Hauke, Gifford & Patalidis
ATTORNEYS INVENTOR
CARL F. BACHLE
BY Hauke, Gifford & Patalidis
ATTORNEYS

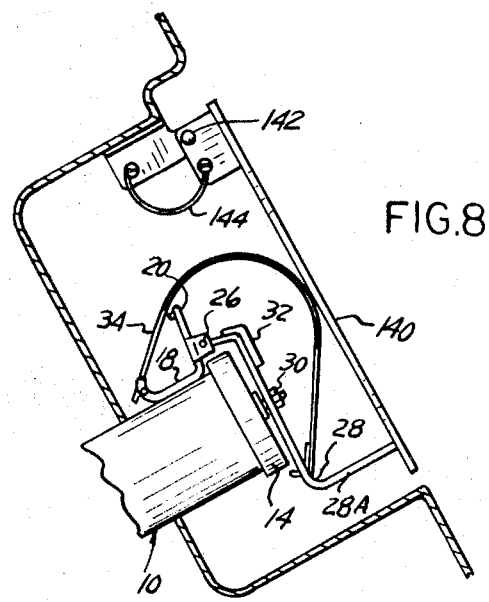
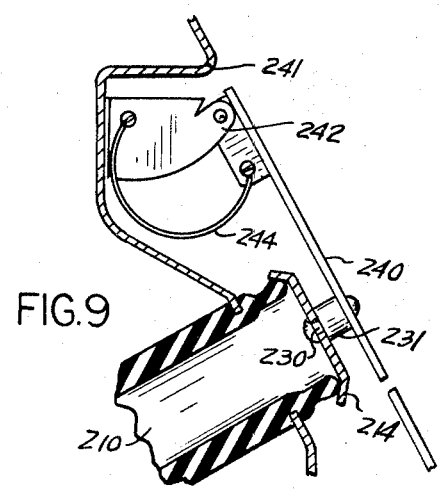
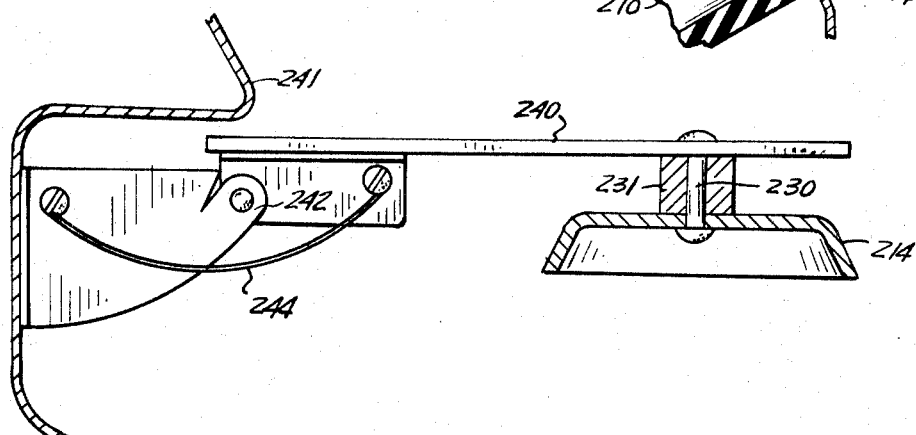
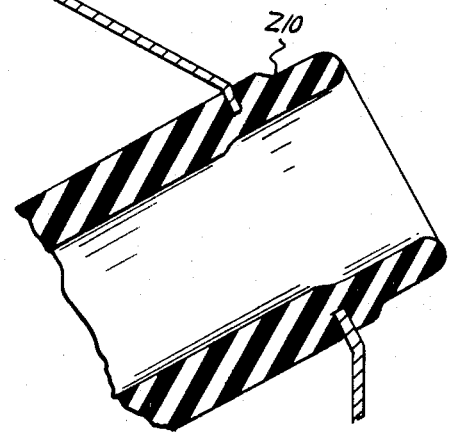

SELF-CLOSING CAP

BACKGROUND OF THE INVENTION

1. Field of the Invention

The present invention relates to self-closing caps and more particularly to such a cap including means for reducing the likelihood that the cap will remain in an open or off position when the machinery utilizing the cap is being operated.

2. Description of the Prior Art

In a number of situations, it is important and in others it is essential that the filler tube for oil or fuel be closed when the device utilizing the oil or fuel is in operation. An example of this is airplanes where both fuel and oil can be lost with disastrous consequences if caps are not in place to close the filler tubes when the airplane is being used.

A hinged cap increases the likelihood that the cap will be closed when the machinery is put into operation because the cap will be in view and little effort will be necessary to move it to the closed position. Even with these types of caps, however, accidents have resulted when the filler tube has been left open.

Spring caps have also been provided but, although these solve the problem of the cap remaining in an open position because they will remain open only as long as they are held in this position, such caps interfere with using the filler tube.

SUMMARY OF THE PRESENT INVENTION

The present invention provides a self-closing cap which is hingedly mounted to the filler tube. An over-center spring construction is provided which, when the cap is moved slightly to one side of the over-center position, the cap will be retained in an open position. This provides for filling the tube with a minimum of interference from the cap. Movement of the cap past the over-center position of the spring in the closing direction causes the cap to be snapped closed.

In addition, means are provided to aid in closing the cap should it be inadvertently left in the open position. In one embodiment, this is accomplished by providing the over-center position closely adjacent the open position of the cap so that vibrations will shake the cap past the over-center position so that it will snap closed. The cap and filler tube are mounted to the engine or other machinery in such a way that the vibrations which will be produced by operation of the machinery will be in a direction which will produce shaking of the cap member in the closing direction.

In another embodiment of the invention, a cover is provided in the sheet metal outer skin of the vehicle which is movable toward and away from the closed cap member. If the cap member is left in the open position, the cover upon closing will strike the cap and move it past the over-center position in the closing direction.

DESCRIPTION OF THE DRAWINGS

A better understanding of the present invention will be achieved upon reference to the accompanying drawings in which like reference characters refer to like parts throughout the several views and in which:

FIG. 1 is an elevational side view of a filler tube and cap comprising one preferred embodiment of the present invention;

FIG. 2 is a view as seen from the left side of FIG. 1;

FIG. 3 is a view similar to FIG. 1 but illustrating the cap in an open position;

FIG. 4 is a top elevational view of the device shown in FIGS. 1–3;

FIG. 8 is a view illustrating a preferred assembly mounted for use as a gasoline filler tube and cap for a vehicle or the like;

FIG. 9 is a view of another preferred assembly similar to the one illustrated in FIG. 8; and FIG. 10 is an enlarged view of the assembly illustrated in FIG. 9 and shown in an open position.

DESCRIPTION OF SEVERAL PREFERRED EMBODIMENTS

Figure 6:
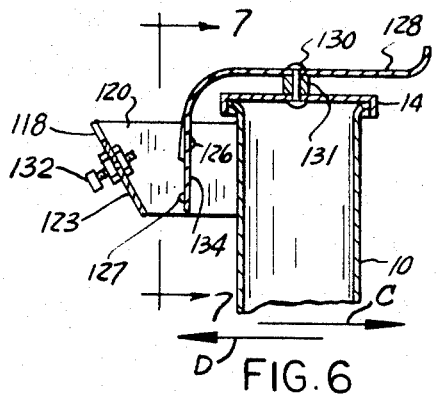
FIG. 6 is a cross-sectional view taken substantially on line 6—6 of FIG. 5.
Figure 6A:
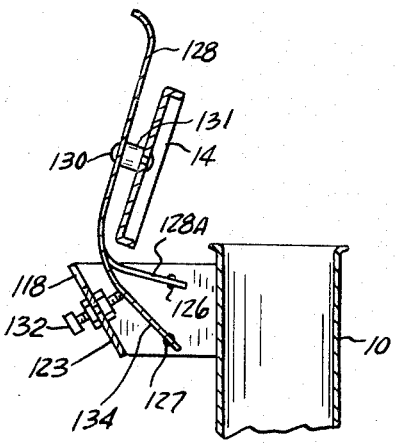
FIG. 6A is a view similar to FIG. 6 but illustrating the cap in an open position.

Now referring to FIGS. 1–4, one preferred embodiment of the present invention is illustrated as comprising a conventional filler tube 10 of the type commonly used to fill a fuel tank or an oil reservoir for an internal combustion engine. Although the tube 10 will be described throughout the following description as intended for either of these two uses, it is to be understood that the present invention has application with tubes for various other uses as well and therefore it is not intended that the present invention be limited to fuel or oil fillers for internal combustion engines.

The tube 10 is preferably cylindrical, having a circular upper opening 12 adapted to be covered by a cap 14. The cap 14 is circular in plan and is provided with a peripheral flange 16 which is disposed over the upper edge of the tube 10 when the cap 14 is in the closed position illustrated in FIGS. 1, 2 and 4. The cap 14 is preferably provided with an interior gasket (not shown) so that the opening 12 is sealed when the cap 14 is in the closed position.

A support bracket 18 has its base secured to the upper exterior surface of the tube 10 by any convenient means, such as welding or the like, to provide an arm portion 20 and a lower, shorter arm portion 22. A hinge bracket 24 is carried by the arm 20 and carries a pin 26 to provide the means for hingedly mounting a handle member 28 to the support bracket 18. The bracket 18 provides an open stop for the handle member 28 to rest when barely over-center as will be more apparent as the description proceeds.

The handle member 28 extends substantially parallel to and somewhat beyond the upper surface of the cap 14 and fastener means 30 are provided, like a ball or rubber, attaching the cap 14 to the handle 28 to permit angular accommodation to give uniform sealing pressure around the circumference of the cap. Lifting the handle 28 and pivoting it about the hinge pin 26 then brings the cap 14 upwardly away from the upper end 12 of the filler tube 10. The ball action provided by the fastener means 30 permits the cap 14 to have substantially uniform circumferential seating engagement pressure with the upper end of the tube 12 when the handle 28 and the cap 14 are moved to a closed position. A spring latch 29 can be provided to engage the end of the handle 28 to help maintain the handle 28 in the closed position. The handle 28 carries a stop member 32 at the end adjacent the hinge pin 26, which cooperates with the arm 20 of the support bracket 18 to limit the extreme open position of the handle 28 and the cap 14.

A flat spring 34 has one end attached to the end of the lower arm 22 of the support bracket 18. The spring 34 is bent into a substantially U-shaped configuration and, as can best be seen in FIG. 4, has its opposite end retained in a slot 36 formed in the handle 28.

The geometry of the hinge and the spring attachment is such that on one side of an over-center position the handle 28 and therefore the cap 14 is urged in a closing direction, while on the other side of the over-center position the spring force retains the cap 14 in the open position illustrated in FIG. 3. The stop member 32 coacts with the arm 20 to position the cap 14 quite close to the over-center position when the cap 14 is open so that slight movement of the cap 14 toward the closed position will move the cap member 14 past the over-center position and permit the spring 34 to snap the cap 14 closed.

The tube 10 is illustrated in FIG. 3, for example, as being mounted vertically to an engine or to machinery and as indicated earlier can be the means for filling a fuel tank or an oil reservoir for the engine or machinery. The engine or machinery will vibrate in certain predominate directions when operating and the cap 14 is positioned on the tube 10 to take advantage of this vibration to insure that the cap 14 will close if it is inadvertently left open with the engine or machinery in operation. Thus, the vibrations in a horizontal plane (as indicated by the arrows A and B in FIG. 1) of the machinery will cause the tube 10 to vibrate in a direction substantially coplanar with the plane of movement of the center of the cap 14 so that the vibrations will tend to shake the cap 14 back and forth between the open and closed positions until the inertia of the cap 14 will cause it to be vibrated past the over-center position and it will snap closed. Because the over-center position is quite close to the open position of the cap 14, slight vibrations in the machinery will cause the cap 14 to close. This substantially reduces the likelihood then of fuel or oil being lost from an open filler tube. In a piston engine this predominate vibration direction is oridinarily in response to torque reaction. In the case of a vehicle, the predominate vibration direction will be vertical so that the cap would be positioned as in FIG. 10.

While the cap 14 will be ordinarily positioned to take advantage of the predominate vibration of the machinery to insure that inertia will cause the cap 14 to be moved past the over-center position so that the closing force of the spring 34 will snap the cap 14 closed, there are some situations where vibrations other than the predominate vibrations will be used. It is only important that the vibrations are of sufficient amplitude to insure that the inertia of the cap 14 will be sufficient to move the cap 14 past an over-center position so that it will be snapped closed. The cap assembly of course will be positioned in such circumstances so that the vibrations selected to provide the trigger for closing the cap 14 will be in a direction which causes the cap 14 to move past the over-center position.

FIGS. 5, 6, 6A and 7 illustrate a construction similar to the embodiment of FIGS. 1-4, but in which the handle 128 and the spring 134 are formed from a single piece of material. As can best be seen in FIGS. 5 and 7, a substantially rectangular piece of spring material, such as spring steel or the like, is slotted part way from one end to form the spring 134 and at each side are stiffer support arms 128A and 128B forming the lever structure. While it has been preferred to illustrate the spring 134 and handle 128 as being formed from a rectangular piece of material, it is clear that these members could be formed of round spring wire or similar material. A cap 14 is mounted to the spring 134 by a loose pin 130 and a rubber washer 131 which permits angular accommodation giving uniform seating pressure. The pin 130 and washer 131 could of course be replaced by a ball and socket fastening means. A support bracket 118 is mounted to the side of the filler tube 10 with spaced arms 120 and 122 supporting a base portion 123 spaced outwardly from the filler tube 10. The support arms 128 are pivoted to the arms 120 and 122 respectively by pins 126, and the spring 134 is pivoted on the arms 120 and 122 by a pin 127. As can best be seen in FIGS. 6A and 7, the pins 126 are located above the pin 127 so that the spring 134 and the support arms 128A and 128B together give a closing force which is maximum in the cap seated position and zero at a point near fully open. Slightly more opening then puts the handle 128 and cap 14 over-center with only a small force required to effect closure. An adjustable stop member 132 is carried by the base portion 123 to engage the support arm 128 to limit opening movement of the handle 128 and the cap 14 and to insure that when opened the cap 14 and handle 128 will be quite close to the over-center position.

Figure 5:
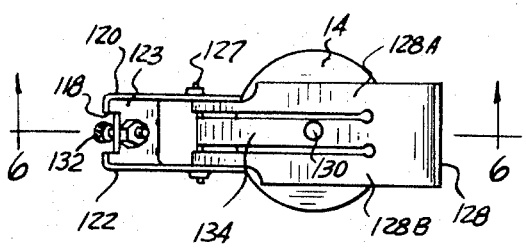
FIG. 5 is a view similar to FIG. 4 but illustrating another preferred embodiment of the present invention.
Figure 7:
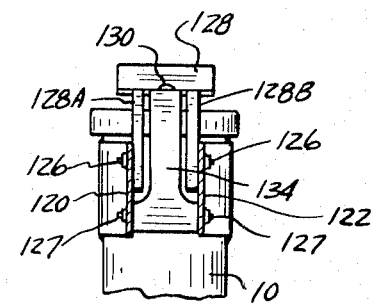
FIG. 7 is a view taken substantially on line 7—7 of FIG. 6.

The construction illustrated in FIGS. 5-7 operates in substantially the same way as the embodiment illustrated in FIGS. 1-4. Slight vibrations (in a horizontal plane as indicated by the arrows C and D in FIG. 6) in the direction of opening and closing of the cap 14 will cause the cap 14 to move past the over-center position and the spring 134 will thereupon snap the cap shut. The tube 10 and cap 14 are positioned to take advantage of the predominate vibrations caused by operation of the machinery or engine with which the tube is used to snap the cap shut. The pin 130 and resilient washer 131 mounting the cap 14 to the spring 134 permit relative movement between these members to enable the cap to seat properly on the open end of the filler tube 10.

As shown in FIG. 8, other means can be provided to insure that the cap 14 will be moved past the over-center position and thereupon be snapped closed. If, for instance, the filler tube 10 is for the purpose of providing gasoline for an automobile engine, it can be positioned so that a gasoline access door represented schematically at 140, which must be opened to obtain access to the filler tube 10, will, when closed again, strike the handle 128 as shown in FIG. 8 to move the cap 14 past the over-center position.

Similarly the tube 10 could be for providing oil to an aircraft engine and the gasoline access door 140 could be the cowling covering the engine of the aircraft. It is quite unlikely that the cowling for aircraft will be left open, but a number of aircraft accidents have occurred which are known to be the result of engine failure because the oil filler cap was not in place when the cowling was closed and the oil for the engine was lost during flight.

To guard against the possibility of both the cap 14 and the door 140 remaining open upon operation of the automobile or the aircraft engine, the door 140 can be mounted by a hinge 142 and a spring 144 mounted near an over-center position when open and to take advantage of the predominate vibrations of the particular machinery with which it is used to snap closed in the same manner as the cap 14. When the door 140 snaps closed it will of course move the handle 128 past the over-center position and it too will snap closed.

FIGS. 9 and 10 illustrate other embodiments similar to that shown in FIG. 8 and which can be used for filler tubes for gasoline tanks for automobiles or for oil filler tubes for aircraft engines. In the embodiment shown the assembly is illustrated for use with automobiles. An access door 240 is mounted to the vehicle body 241 by hinges 242 and a spring 244. The hinges 242 and the spring 244 are positioned to maintain the door 240 in the open position shown and to snap the door closed when the door 240 is moved past the over-center position in the manner described above. The door 240 carries a cap 214 in a position to close the upper end of filler tube 210 when the door 240 is in the closed position. To provide the necessary sealing engagement between the cap 214 and the filler tube 210, the cap 214 is preferably mounted to the door 240 by a pin 230 and a resilient washer 231 which permits relative movement between the cap 214 and the door 240. Also the tube 210 is preferably constructed of a resilient material such as rubber or the like. The door 240 is mounted to take advantage of the predominate vertical vibrations of the automobile when in operation so that the door 240 will by inertia be vibrated past the over-center position to be snapped closed by the spring 244. If the door 240 is for an automobile gasoline tank filler tube then it will be preferred to mount the door 240 to take advantage of the vertical vibratory motions of the automobile as the automobile is moving along a road to close the door 240. It is not likely that a gasoline attendant would leave the cap and door open. If he did, vertical forces from road unevenness during operation of the automobile would soon shake the door 240 past the over-center position and it would thereupon close to seat the cap 214.

It is apparent that the present invention provides a means for insuring that the cap to a filler tube will not remain open during operation of the machinery or engine with which it is used. Several forms of the invention have been illustrated, but it is apparent that the invention can take many forms and it is not intended that it be limited to those shown.

I claim:

1. In combination with a cap for a liquid filler tube or the like for machinery:

means for mounting said cap for pivotal movement between an open position providing access to the filler tube and a closed position closing the top of the filler tube;

a handle attached to said cap and pivotally mounted to said filler tube; and a spring member having one end attached to said tube and another end attached to said handle, said spring member operable to urge said cap toward a closed position when said cap is pivoted past an over-center position and, in the absence of vibration, to retain said cap in an open position when said cap is pivoted past said over-center position in the direction of said open position, and said spring member being responsive to vibration of said machinery for urging said cap past said over-center position toward said closed position to reduce the likelihood of said cap being in the open position while said machinery is in use.

2. The invention as defined in claim 1 and further comprising an access cover movably mounted adjacent said filler tube, said access cover being movable away from said filler tube to provide access to said filler tube but being movable into said cap when said cap is in an open position in a direction which urges said cap to pivot past said over-center position toward the closed position.

3. The invention as defined in claim 1 and including stop means limiting movement of said cap past said over-center position in the opening direction to thereby cause slight movements of said cap from the open position to move said cap past said over-center position in the closing direction.

4. The invention as defined in claim 1 and in which said handle and said spring are formed from a single piece of material.

5. The invention as defined in claim 1 and including a latch member to provide additional holding force to keep the cap member in the closed position.

* * * * *